July 26, 1966   T. D. DE PASQUA   3,262,535
ADJUSTABLE SCREW TYPE LIMIT STOP
Filed Sept. 25, 1964
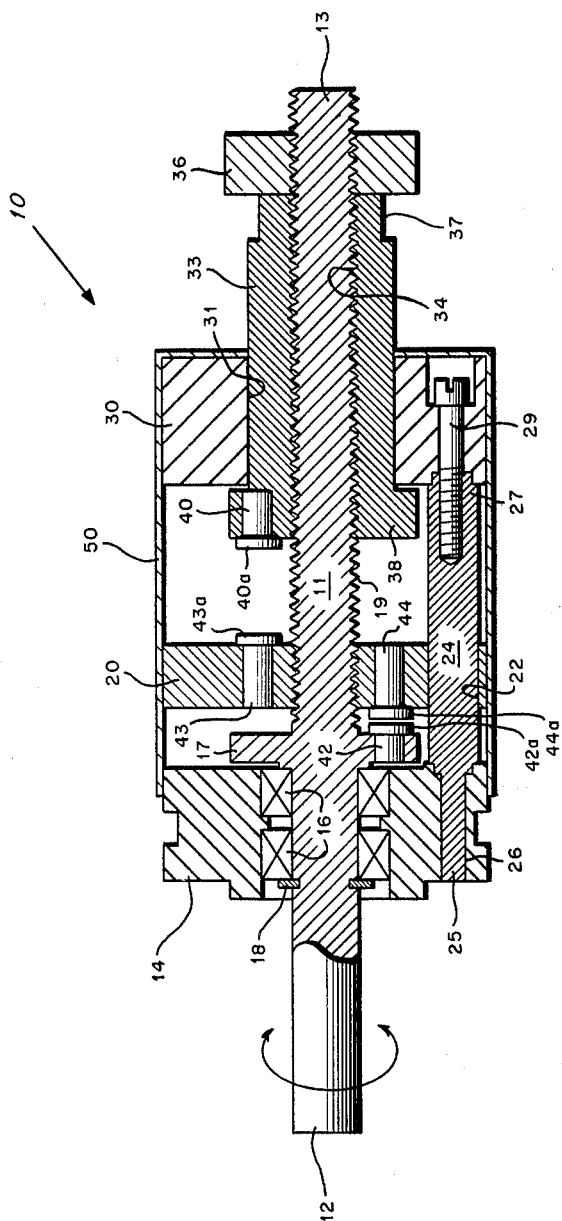
INVENTOR.
THOMAS D. DE PASQUA
BY
ATTORNEYS

United States Patent Office 3,262,535
Patented July 26, 1966

3,262,535
ADJUSTABLE SCREW TYPE LIMIT STOP
Thomas D. De Pasqua, Levittown, Pa., assignor to the United States of America as represented by the Secretary of the Navy
Filed Sept. 25, 1964, Ser. No. 399,418
9 Claims. (Cl. 192—141)

The invention described herein may be manufactured and used by or for the Government of the United States of America for governmental purposes without the payment of any royalties thereon or therefor.

The present invention relates to limit stop mechanisms, and more particularly to the traveling nut type stop mechanism for limiting the number of turns of a drive shaft in either direction.

Limit stop mechanisms are protective devices which limit the travel of shafts, cams, lead screws, integrator carriages and electrical components, such as synchros, encoders and potentiometers. Frequently in the employment of a limiting device with the above it is desirable to limit or adjust the rotation of the device to a certain number of turns and parts of turns and to do so by external adjustment.

With the advent of miniaturization and compactness of equipments very little space remains between components, synchros, motors, encoders and potentiometers in the various systems where such equipments are employed. Limit stop mechanisms of the prior art have been found unsuitable for use in the above-noted environment. Some of these prior art mechanisms require that the cover used for protecting the apparatus against adverse environmental conditions must be removed for purposes of adjusting the limit stop mechanism. Removal of this cover obviously necessitates additional clearance adjacent the physical diameter of the limit stop mechanism. Such clearance is undesirable since a reduction in compactness ensues. Also, removal of the mechanism cover, even for a short period, permits dirt and other adverse environmental elements to enter the mechanism and affect the operation thereof. Various other prior art mechanisms require adjustment of the stop mechanism by rods or wrenches which extend laterally of the mechanism thereby necessitating clearance about the physical diameter thereof with the concomitant result of package expansion. Also, in those prior art devices requiring adjustment tools which extend radially from the limit stop mechanism, the use of these tools and thereby the adjustment of the stop mechanism would be limited by the proximity of adjacent equipment. A further disadvantage is that the special rods or other tools necessary for adjustment may become misplaced or lost, or otherwise unavailable.

The above and other disadvantages of the prior art devices are precluded by the present invention wherein a limit stop mechanism is provided which limits the rotation of, for example, an electrical component and which in that environment may be used anywhere in the gear train. External adjustment of the limit stop mechanism is provided without removal of the cover thereabout and this adjustment may be achieved with ordinary bench tools. Adjustment is further obtained without the necessity for any clearance about the physical diameter of the limit stop mechanism.

It is an object of the present invention to provide an inexpensive, compact, accurate, self-contained limit stop mechanism for limiting the travel or rotation of electrical or mechanical components.

It is a further object of the present invention to provide a limit stop mechanism for limiting the travel or rotation of external components; the mechanism being externally adjustable to limit the travel or rotation of the electrical or mechanical component.

A still further object of the present invention is to provide a limit stop mechanism which is externally adjustable by use of ordinary bench tools and which requires no clearance about the physical diameter of the stop mechanism to so adjust the same.

These and other objects and features of the invention will become apparent to those skilled in the art as the disclosure is made in the following description of an embodiment of the invention as illustrated in the accompanying sheet of drawing in which the figure represents a partial cross-sectional view of the novel limit stop mechanism.

In the illustrated embodiment of the invention a self-contained, externally adjustable limit stop mechanism is generally noted at 10. Mechanism 10 includes a shaft 11 having a forward outside extension end 12 for attachment to a load, not shown, and whose rotational displacement is to be maintained within certain maximum and minimum values. A manner in which the shaft 11 may be attached to the load is illustrated in U.S. Patent No. 2,620,911 to Alfred Krell for Limit Stop issued December 9, 1952. Shaft 11 is journaled for rotation within a disc-shaped base member 14 by bearing assemblies 16. Shoulder 17 formed integrally with shaft 11 and retaining ring 18 each abut bearing assemblies 16 and maintain shaft 11 longitudinally fixed with respect to the disc-shaped base member 14.

The portion of shaft 11 extending beyond shoulder 17 is threaded at 19 for receiving a circular stop plate or traveling nut 20 for longitudinal movement therealong. Traveling nut 20 is precluded from rotation about shaft 11 by sliding engagement of a plurality of apertures 22 formed in traveling nut 20 with a complementary number of longitudinally extending spacer rods 24. Although normally three apertures 22 are formed at 120° intervals about the traveling nut 20 and three rods or spacers 24 engage the same, only one aperture and rod is illustrated in the figure.

Spacer rods 24 are formed at one end 25 for attachment to complementary grooves 26 provided in base member 14 and are tapped at the other end 27 to receive a fastener 29 for securing the spacer 24 to an annular plate or rear housing generally noted at 30.

Housing 30 slidably and rotatably receives through an opening 31 formed therein a cylindrical stop member at traveler 33. Member 33 is centrally internally threaded at 34 and receives a threaded adjustment end 13 of shaft 11 for longitudinal adjustment with respect thereto.

In order to lock member 33 relative to shaft 11, a jam nut 36 is internally threaded to receive the adjustment end portion 13 of shaft 11 and to abut the stop member 33.

Stop member 33 is further provided with a circular shoulder portion 38 for limiting the outward movement of the stop member with respect to shaft 11 and for housing a contact pin 40 including head 40a for purposes described below. Similarly shoulder 17 of shaft 11 is provided with a contact pin 42 including head portion 42a.

As may be readily observed, rotation of shaft 11 causes stop plate or traveling nut 20 to traverse a longitudinal path between the shoulder 17 and the cylindrical stop member 33. In order to preclude a frictional binding of plate 20 with the outer surfaces of the above-noted members 17 and 33 and to increase the sensitivity of the mechanism 10, plate 20 is provided with a pair of contact pins 43 and 44 including heads 43a and 44a, respectively. Contact pin 43 is so located and so designed with respect to the pitch of threaded portion 19 that heads 40a and 43a have their complementary and mutual side surfaces abut to preclude further movement of plate 20 when the shaft is rotated in one direction. When the shaft is rotated in another direction, the travel of plate 20 is precluded by the abutment of the side surfaces of heads 42a and 44a of contact pins 42 and 44, respectively.

It should be understood that the number of permissible turns of shaft 11 from locked position to locked position is determined by the distance between shoulders 17 and 38 and the pitch of the threaded shaft portion 19 between these shoulders.

For purposes of precluding dirt or other environmental factors from entering within the confines of the mechanism described above, a cover 50 is fitted about or otherwise secured to the above-mentioned elements.

To preclude galling the various units employed in mechanism 10 are constructed of different material. For example, base 14, stop plate 20 and rear housing 30 may be constructed of brass while shaft 11, traveler 33 and spacers 24 may be constructed of stainless steel, and finally cover can 50 may be constructed of aluminum.

The manner in which mechanism 10 may be set to any desired number of turns or parts thereof within design limits for use in gear trains or otherwise will now be described. The forward outside extension 12 of shaft 11, that is the gear end, is rotated as far as possible in a direction to cause abutment of linearly traveling contact pin 44 with orbiting pin 42. Jam nut 36 is removed from the adjustment end 13 of shaft 11 and traveler 33 is rotated about shaft 11 until orbiting pin 40 abuts contact pin 43. This is the zero position. To set the required number of turns or parts of turns the traveler 33 is rotated the desired number of turns or parts of turns in a direction opposite to that mentioned above. It is understood that the protruding part of the shaft outside of the confines of the mechanism 10 may be provided with scribed marks for use as guides in setting the traveler 33. When traveler 33 is properly positioned the same is finally locked into position by replacing the jam nut 38 to abut the external surface of the traveler 33. The mechanism is now set for the prescribed number of turns of parts of turns.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A self-contained, externally adjustable limit stop mechanism comprising:
    a pair of spaced supports;
    a shaft threaded along a portion of the length thereof journaled for rotation within said supports and extending beyond the confines thereof, said shaft having a first stop member rotatable therewith;
    a second stop member interposed between one of said supports and said threaded portion of said shaft and threadably engaging the latter, whereby said second stop member is rotatable with said shaft, said second stop member extending outwardly beyond the confines of said one support;
    and traversing means threadably engaging said threaded portion of said shaft between said first stop member and said second stop member for longitudinal movement along said shaft in response to rotation of said shaft.

2. The mechanism as defined in claim 1 further including spacer means for interconnecting said spaced supports and for precluding rotation of said traversing means upon rotation of said shaft.

3. The mechanism as defined in claim 1 further including means for retaining said shaft in a fixed longitudinal position with respect to said supports.

4. The mechanism as defined in claim 1 further including:
    inwardly extending pin means secured to said stop members;
    and complementary pin means secured to and extending from each side of said traversing means and positioned for engagement with said pin means on said stop members.

5. The mechanism as defined in claim 1 further including locking means threadably engaging said threaded portion of said shaft for engaging said second stop member and locking the same relative to said shaft.

6. The mechanism as defined in claim 1 further including means for covering the area between said supports.

7. The mechanism as defined in claim 4 wherein said pin means and said complementary pin means include disc-shaped head portions, whereby rotation of said shaft is precluded when the sides of said head portions abut each other.

8. The mechanism as defined in claim 1 wherein said first stop member is formed integrally with said shaft adjacent one of said supports.

9. A self-contained, externally adjustable limit stop mechanism comprising:
    a plurality of spaced supports;
    a shaft threaded along a portion of the length thereof journaled for rotation within said supports,
    said shaft having a first stop member rotatable therewith;
    a second stop member interposed between one of said supports and said threaded portion of said shaft and threadably engaging the latter, whereby said second stop member is rotatable with said shaft;
    said second stop member extending outwardly beyond the confines of said one support;
    and traversing means threadably engaging said threaded portion of said shaft between said first stop member and said second stop member for longitudinal movement along said shaft in response to rotation of said shaft.

References Cited by the Examiner

UNITED STATES PATENTS

| | | |
|---|---|---|
| 1,226,587 | 5/1917 | Paul. |
| 3,209,090 | 9/1965 | Fry _____ 192—141 X |

References Cited by the Applicant

UNITED STATES PATENTS

| | | |
|---|---|---|
| 808,273 | 12/1905 | Darlington. |
| 2,660,281 | 11/1953 | Ochtman. |
| 2,854,113 | 9/1958 | Hallden. |

DAVID J. WILLIAMOWSKY, *Primary Examiner.*

B. W. WYCHE III, *Assistant Examiner.*